US011274916B2

(12) United States Patent
Ishige et al.

(10) Patent No.: US 11,274,916 B2
(45) Date of Patent: Mar. 15, 2022

(54) MEASUREMENT DEVICE EMPLOYING COLOR APPEARING DUE TO INTERFERENCE OF WHITE LIGHT, SYSTEM, AND PROGRAM

(71) Applicant: MITUTOYO CORPORATION, Kanagawa (JP)

(72) Inventors: Masashi Ishige, Kanagawa (JP); Yuko Shishido, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/918,482

(22) Filed: Jul. 1, 2020

(65) Prior Publication Data

US 2021/0003381 A1     Jan. 7, 2021

(30) Foreign Application Priority Data

Jul. 3, 2019    (JP) .............................. JP2019-124383

(51) Int. Cl.
| | | |
|---|---|---|
| *G01B 9/02* | (2006.01) | |
| *G01B 11/24* | (2006.01) | |
| *G01B 11/27* | (2006.01) | |
| *G01B 9/0209* | (2022.01) | |
| *G02B 21/00* | (2006.01) | |

(52) U.S. Cl.
CPC ....... *G01B 9/0209* (2013.01); *G01B 9/02088* (2013.01); *G01B 9/02089* (2013.01); *G01B 11/2441* (2013.01); *G01B 11/27* (2013.01); *G02B 21/0056* (2013.01)

(58) Field of Classification Search
CPC ............ G01B 9/02088; G01B 9/02089; G01B 9/0209; G01B 11/2441
See application file for complete search history.

(56) References Cited

U.S. PATENT DOCUMENTS

| | | | | |
|---|---|---|---|---|
| 2002/0088928 A1* | 7/2002 | Noda | .................... | G02F 1/1309 250/226 |
| 2005/0007599 A1* | 1/2005 | deGroot | ............ | G01B 11/2441 356/511 |
| 2009/0182528 A1* | 7/2009 | De Groot | ........... | G01B 11/0675 702/167 |

(Continued)

FOREIGN PATENT DOCUMENTS

| | | |
|---|---|---|
| JP | 2010-112865 | 5/2010 |
| JP | 2016-099213 | 5/2016 |

OTHER PUBLICATIONS

"3D profiling by interferometry method", Katsuichi Kitagawa, Journal of the Society of Instrument and Control Engineers, SICE, vol. 50, No. 2, Feb. 2011, pp. 97-104, Discussed in specification, 8 pages.

(Continued)

*Primary Examiner* — Michael A Lyons
(74) *Attorney, Agent, or Firm* — Rankin, Hill & Clark LLP (57) ABSTRACT

A device including: a storage section that stores information for measuring a light path difference of two light paths relating to interference of a white light, from a color appearing due to the interference; and a calculation section that measures, from an image configured by a plurality of pixels each including information representing a color, the light path difference relating to each of the pixels, based on at least the information stored in the storage section.

10 Claims, 6 Drawing Sheets

(56) References Cited

U.S. PATENT DOCUMENTS

2013/0335747 A1* 12/2013 Haitjema ............... G01N 21/45
356/503
2016/0299121 A1* 10/2016 Fu .......................... A61B 5/445

OTHER PUBLICATIONS

"3D profiling by interferometry method", Katsuichi Kitagawa, Journal of the Society of Instrument and Control Engineers, SICE, vol. 50, No. 2, Feb. 2011, pp. 97-104, discussed in specification, English translated included, 24 pages.

* cited by examiner

FIG. 7

MEASUREMENT DEVICE EMPLOYING COLOR APPEARING DUE TO INTERFERENCE OF WHITE LIGHT, SYSTEM, AND PROGRAM

CROSS-REFERENCE TO RELATED APPLICATIONS

This application is based upon and claims the benefit of Japanese Patent Application No. 2019-124383, filed on Jul. 3, 2019, the entire contents of which are incorporated herein by reference.

BACKGROUND

Field

The present embodiment relates to measurement utilizing interference of a white light.

Description of the Related Art

In conventional fine shape measurement employing a white light interferometer, generally, there is a need to implement a precise scan in a workpiece height direction, that is, a Z axis direction that, when a plane on which a measuring object has been placed is assumed to be an XY plane, is orthogonal to said plane, and thereby image the measuring object at each of positions of the Z axis, and acquire an integrated image (for example, Japanese Laid-Open Patent Publication Nos. 2016-99213, 2010-112865, and "3D profiling by interferometry method", Katsuichi Kitagawa, Journal of the Society of Instrument and Control Engineers, SICE, vol. 50, No. 2, February 2011, pp. 97-104). This is because a Z axis position of each of sections of the measuring object is calculated as a Z axis position of an image where a peak of an interference fringe has appeared.

In such a method, even if the precise scan is performed in a short time by contriving an algorithm, and so on, effects of vibration cannot be eliminated completely, and consideration must be given to the likes of position shifts between images configuring the integrated image.

The present invention, which was made in view of the above, tackles a problem of performing measurement relating to a measuring object from a single image imaging said measuring object.

DETAILED DESCRIPTION

A first aspect of the present invention is a device including: a storage section that stores information for measuring a light path difference of two light paths relating to interference of a white light, from a color appearing due to the interference; and a calculation section that measures, from an image configured by a plurality of pixels each including information representing a color, the light path difference relating to each of the pixels, based on the information stored in the storage section.

Now, the information stored in the storage section may be a table configured from a plurality of sets of: a value enabling derivation of a ratio of configuring elements of a color; and a value enabling derivation of the light path difference corresponding to said ratio.

Due to such a configuration, the light path difference of two interfering light paths relating to each of the pixels can be measured from a single image imaging interference fringes caused by interference of the white light. Hence, shifts at least in XY axis directions between images caused by effects of vibration, no longer need to be considered.

Note that, usually, a measuring object is imaged in the above-described image. The above-described calculation section may further measure a shape of the measuring object from the measured light path difference relating to each of the pixels, and the above-described device may further include a display section for displaying the measured shape of the measuring object.

By so doing, the shape of the measuring object can be confirmed from a single image imaging interference fringes caused by interference of the white light including said measuring object.

A second aspect of the present invention is a system including the above-described device and an optical system. The optical system includes: a light source section that generates the white light; an imaging section that generates the image; a reference object; a light path being a first light path from the light source section to the imaging section, the light path being turned back by at least the reference object; and a light path being a second light path from the light source section to the imaging section, the light path being turned back by at least the measuring object, and the optical system is configured so that a light passing along the first light path and a light passing along the second light path interfere. Now, the information stored in the storage section is preferably determined based at least partially on the optical system and the measuring object.

Note that the above-described optical system is preferably configured so that the light path difference closest to zero for which intensification of the light due to the interference becomes maximum, differs according to a wavelength of the light.

Due to such a system, the shape of the measuring object can be obtained merely by generating a single image, that is, without scanning in a Z axis direction being performed to generate a plurality of images. As a result, shape measurement of the measuring object is possible at an extremely high speed compared to formerly.

A third aspect of the present invention is a program for a computer. The computer has stored therein information for measuring a light path difference of two light paths relating to interference of a white light, from a color appearing due to the interference. The program causes said computer to measure, from an image configured by a plurality of pixels each including information representing a color, the light path difference relating to each of the pixels, based on at least the above-described stored information.

Due to such a program, the light path difference of two interfering light paths relating to each of the pixels can be measured from a single image imaging interference fringes caused by interference of the white light.

An embodiment of the present invention will be described in detail below with reference to the drawings. The description below is merely an exemplification of implementation of the present invention. Hence, it should be noted that the present invention is not limited to what is described below, and that a variety of alterations are possible in a range not departing from the spirit of the present invention.

1 Configuration of Embodiment of Present Invention

Figure 1:
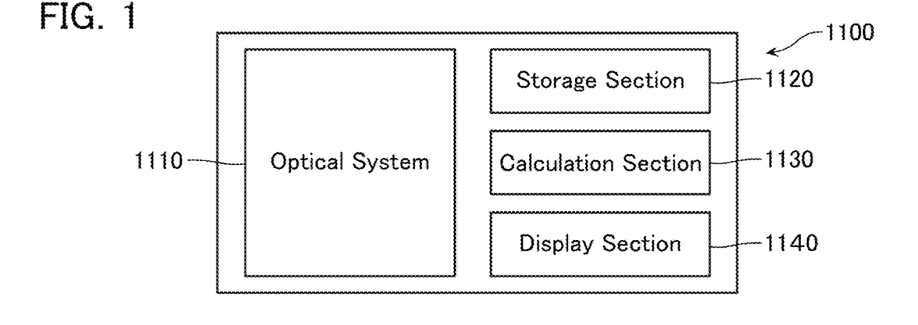
FIG. 1 is a block diagram showing a schematic configuration of a system 1100 being an embodiment of the present invention.

FIG. 1 is a block diagram showing a schematic configuration of a system 1100 being an embodiment of the present invention. Note that another embodiment of the present invention need not include the whole of the configuration included in the system 1100.

The system 1100 includes an optical system 1110, a storage section 1120, a calculation section 1130, and a display section 1140. Specifically, in the present embodiment, the optical system 1110 is configured by a microscope 100 whose outward appearance is shown in FIG. 2A, and the storage section 1120, the calculation section 1130, and the display section 1140 are configured by a computer.

1-1 Microscope 100

Figure 2A:
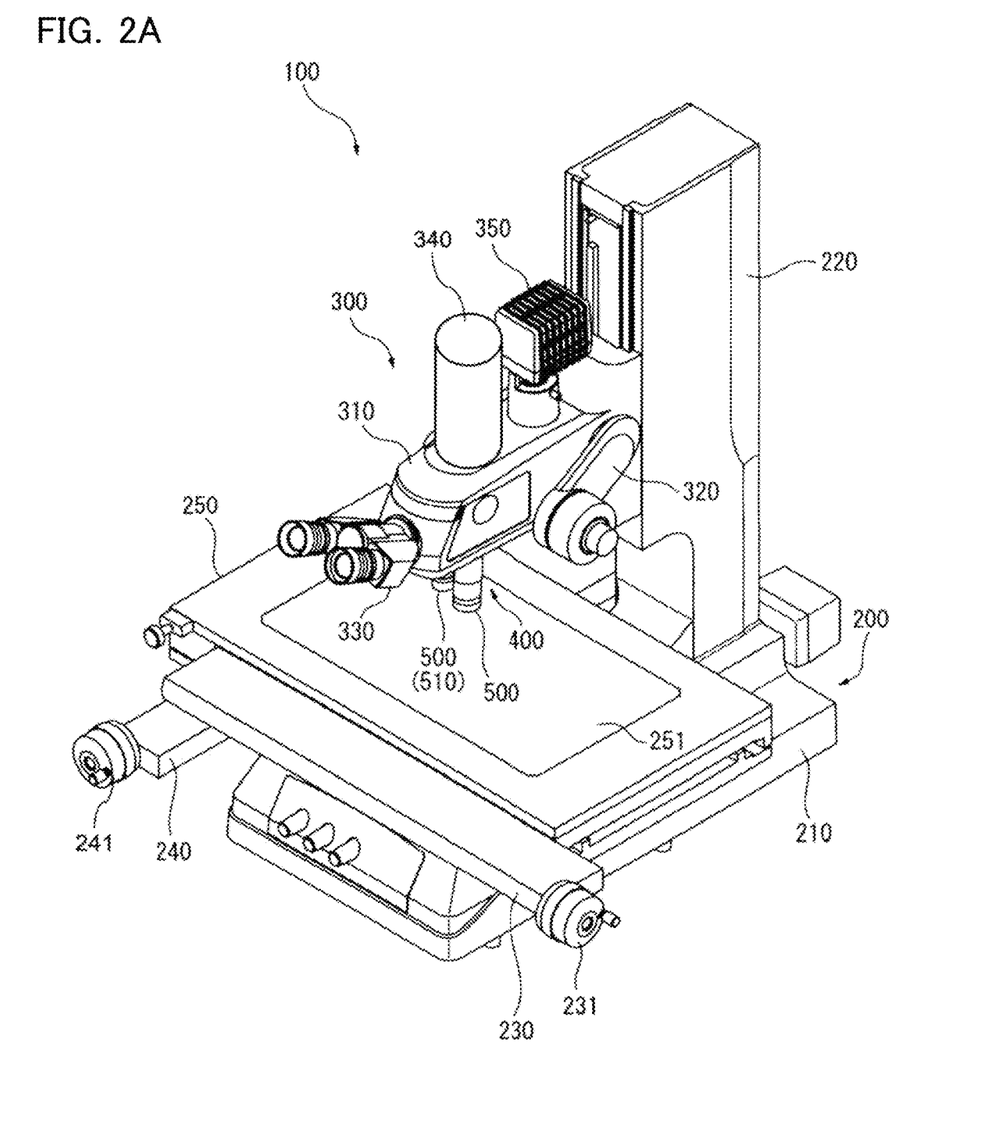
FIG. 2A shows an outward appearance of a microscope 100.

The microscope 100 whose outward appearance is shown in FIG. 2A is of finite correction optical type, and can have its magnification appropriately changed according to the likes of a position or state of an observation region of an unillustrated object-to-be-observed.

This microscope 100 comprises a placing table 200 and a microscope main body 300.

The placing table 200 comprises a pedestal section 210 fixedly placed on an unillustrated work table for observation, for example. This pedestal section 210 is integrally provided with a support column section 220 whose axial direction has been substantially aligned with a vertical direction.

Furthermore, the pedestal section 210 has arranged thereon an X axis moving section 230 and a Y axis moving section 240. Moreover, these X axis moving section 230 and Y axis moving section 240 are provided with a placing plate 250 which is movable in a horizontal direction with respect to the pedestal section 210. This placing plate 250 is moved in one direction being a planar direction representing an X axis direction by rotation operation of an X axis rotation operation section 231 of the X axis moving section 230, and is moved in another direction being a planar direction representing a Y axis direction orthogonal to the one direction by rotation operation of a Y axis rotation operation section 241 of the Y axis moving section 240.

Moreover, the placing plate 250 is provided with a placing glass 251 in a manner enabling measurement by transmitted illumination, for example.

The microscope main body 300 is arranged to be movable along the vertical direction on the support column section 220 of the placing table 200. This microscope main body 300 comprises a casing 310. This casing 310 has arranged therein a Z axis rotation operation section 320 which is arranged able to be rotation operated, and which, by rotation operation, moves the casing 310 along the vertical direction. Furthermore, the casing 310 has arranged therein an eyepiece lens 330 and a camera 340. The camera 340, which configures an imaging section of the optical system 1110, images an XY plane of the microscope 100, that is, a plane parallel to a plane perpendicular to a Z axis. Moreover, the camera 340 is a color camera, that is, is capable of generating an image configured by a plurality of pixels each including information representing a color. One example of information representing a color is an RGB value. The camera 340 is connected by wire or wirelessly to the unillustrated computer, and data representing the image imaged by the camera 340 is transmitted to said computer.

Moreover, the casing 310 has arranged therein various kinds of optical system members such as a reflecting mirror or a half mirror. Furthermore, the casing 310 has arranged therein a light source 350 configuring a light source section of the optical system 1110. This light source 350 is arranged in a state of emitting a light downwardly along substantially the vertical direction. The light source 350 is a white light source having a broadband spectrum, such as a halogen lamp, a xenon lamp, a mercury lamp, metal halide lamp, or an LED, for example.

The light emitted from the light source 350 is irradiated on the object-to-be-observed by the various kinds of optical system members. Moreover, a light reflected by the object-to-be-observed reaches the eyepiece lens 330 and the camera 340 due to the various kinds of optical system members.

Moreover, a lower surface of the casing 310 of the microscope main body 300 has arranged thereon an objective lens switching device 400. This objective lens switching device 400 has installed therein in an attachable/detachable manner a plurality of, for example, two finite correction optical type objective lenses 500, and switches the objective lenses 500 to a state of being positioned on an optical axis by operation of an observer. In the microscope 100, at least one of the objective lenses 500 is an interference objective lens 510.

Figure 2B:
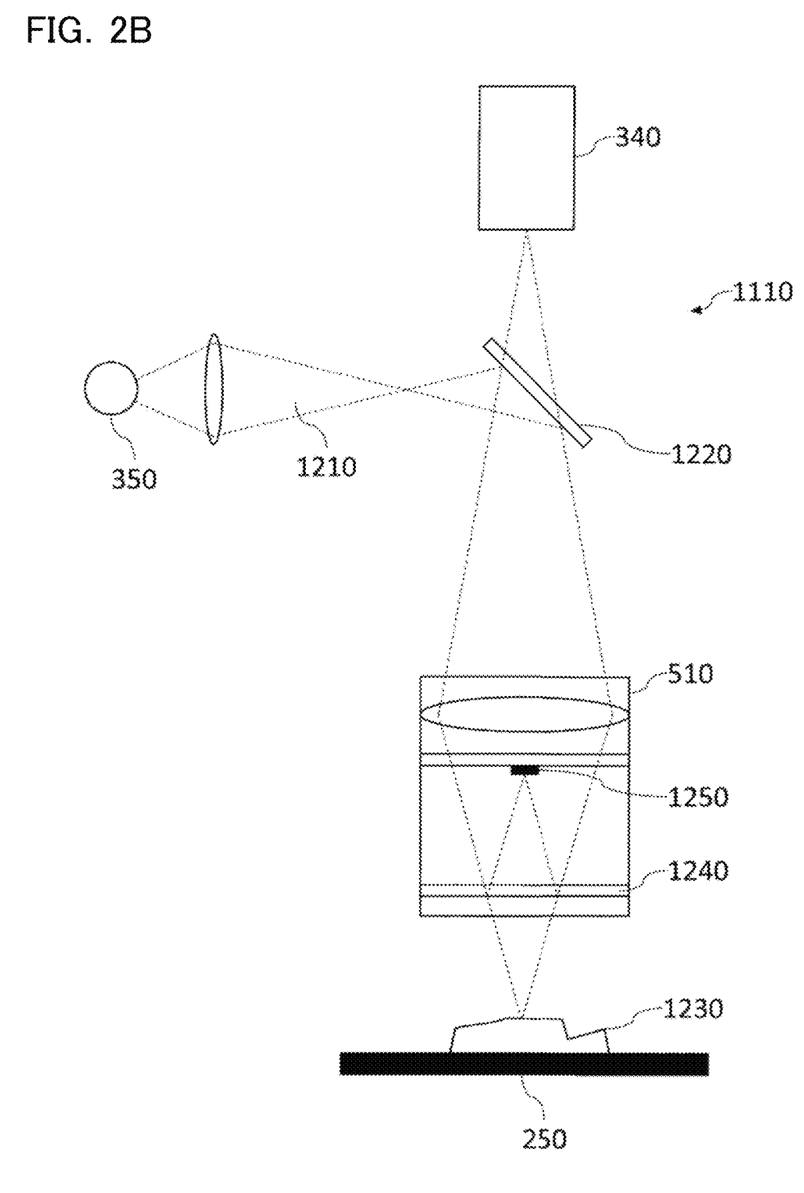
FIG. 2B shows an outline of an optical system 1110 configured by the microscope 100.

The interference objective lens 510 will be described below with reference to FIG. 2B. FIG. 2B shows an outline of the optical system 1110 configured by the microscope 100. However, it should be noted that FIG. 2B has been simplified for purposes of description, that there are various kinds of optical system members that have been omitted therefrom, and, moreover, that a shape, dimensions, layout, and so on, of an optical system member shown therein may differ from actuality.

The exemplificative optical system 1110 whose outline is shown in FIG. 2B corresponds to a Mirau type interferometer of microscope type measuring a minute visual field with high resolution. A white light 1210 from the light source 350 is transmitted through the interference objective lens 510 via a beam splitter 1220 being a half mirror, for example, and thereby irradiates an object-to-be-observed (hereafter, called a "measuring object") 1230. In the interference objective lens 510, division is made into a light to be transmitted through and a light to be reflected by a beam splitter 1240, and the light that has been reflected by the beam splitter 1240 is reflected by a reference object, preferably a minute reference mirror 1250, and is reflected again by the beam splitter 1240 to become a reference light that heads toward the camera 340. On the other hand, a measuring light that has been transmitted through the beam splitter 1240 to irradiate and be reflected by the measuring object 1230 is transmitted through the beam splitter 1240 to overlap the reference light and head toward the camera 340.

That is, the optical system 1110 includes: a light path being a first light path from the light source 350 to the camera 340, the light path being turned back by at least the reference mirror 1250; and a light path being a second light path from the light source 350 to the camera 340, the light path being turned back by at least the measuring object 1230, and the optical system 1110 is configured so that the light passing along the first light path and the light passing along the second light path interfere.

Note that, as will be mentioned later, the system 1100 utilizes interference fringes appearing due to interference of white light. As is well known by a person skilled in the art, interference fringes appearing due to interference of white light appear only when a light path difference of two light paths relating to interference is in an extremely narrow range. Therefore, an interference objective lens whose depth of focus roughly matches a range where the interference fringes occur, is preferred as the interference objective lens 510. This is because such an interference objective lens 510 enables the interference fringes to be imaged when focused.

1-2 Computer Configuring Storage Section 1120, Calculation Section 1130, and Display Section 1140

In the present embodiment, the storage section 1120, the calculation section 1130, and the display section 1140 are a functional means realized by cooperation of software, that is, a program, and hardware resources. Although said computer may be a standard personal computer, it may be an arbitrary computer having a hardware configuration of the kind described in the final section of the present specification. Moreover, in another embodiment, that which corresponds to said computer is sometimes incorporated into that which corresponds to the microscope 100.

The storage section 1120 stores information for measuring a light path difference of two light paths relating to interference of a white light, from a color appearing due to the interference. Said information will be mentioned in detail later.

The calculation section 1130 measures, from an image configured by a plurality of pixels each including information representing a color, the light path difference relating to each of the pixels, based on at least the information stored in the storage section. The calculation section 1130 may further measure a shape of the measuring object 1230 from the measured light path difference relating to each of the pixels. Said measurement will be mentioned in detail later.

The display section 1140 displays the measured shape of the measuring object 1230. A method of display is arbitrary, such as three-dimensional rendering display or two-dimensional display of shape of a certain cross section of the measuring object 1230.

Figure 3:
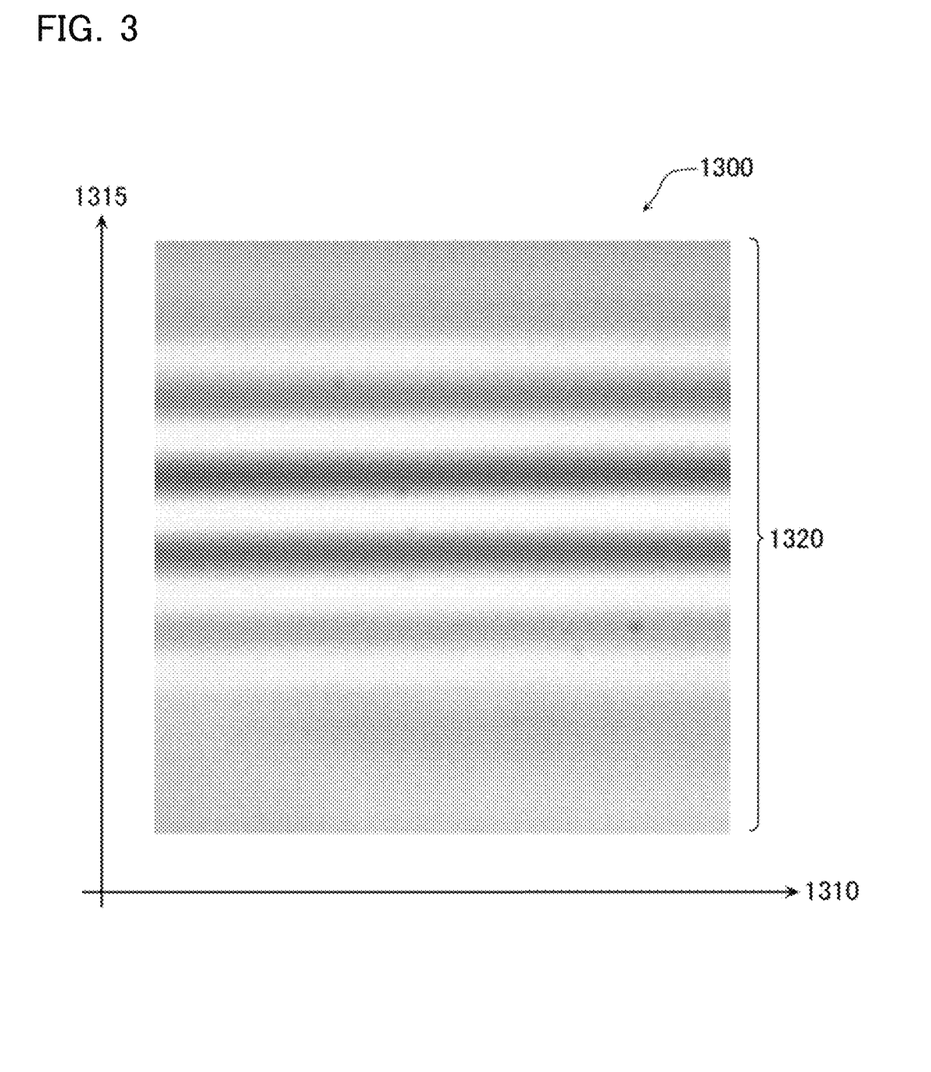
FIG. 3 shows an image 1300 imaged by a camera 340.

2 Principle Relating to Embodiment of Present Invention 2-1 Regarding Measurement of Light Path Difference of Two Light Paths Relating to Interference FIG. 3 is an image 1300 obtained by imaging a certain measuring object 1230 using the microscope 100. The measuring object 1230 in the image 1300 has a height (a Z axis position) which is the same in a direction 1310, and has a height that decreases with a constant inclination in a direction 1315. 1320 indicates interference fringes that have appeared due to interference of a white light. It should be noted that the image actually obtained is a color image, hence a variety of colors appear in the interference fringes.

Figure 4A:
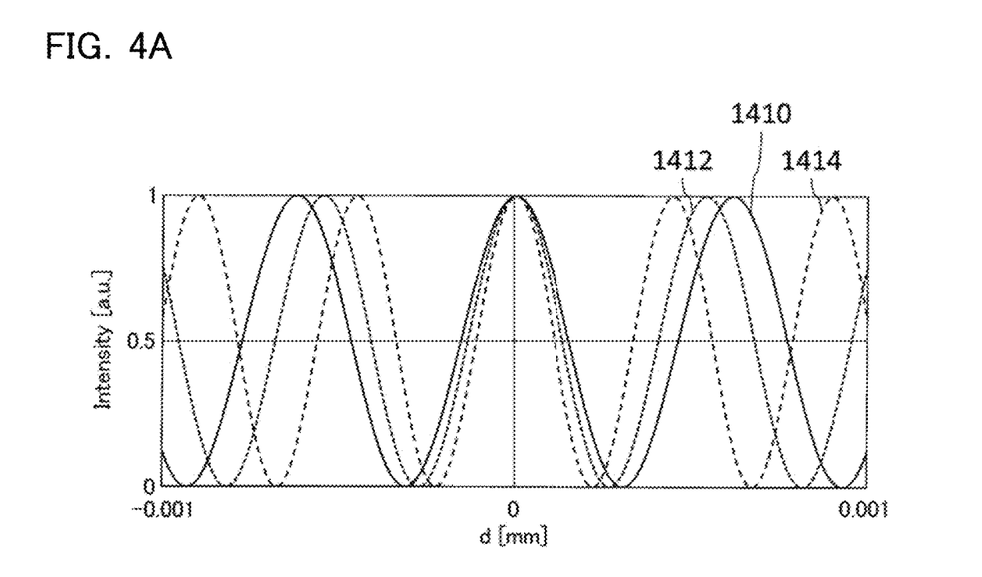
FIG. 4A is a graph showing a relationship of a light path difference d of two light paths relating to interference, and intensity of light when said interference has occurred, in the case where an ideal optical system has been employed.
Figure 4B:
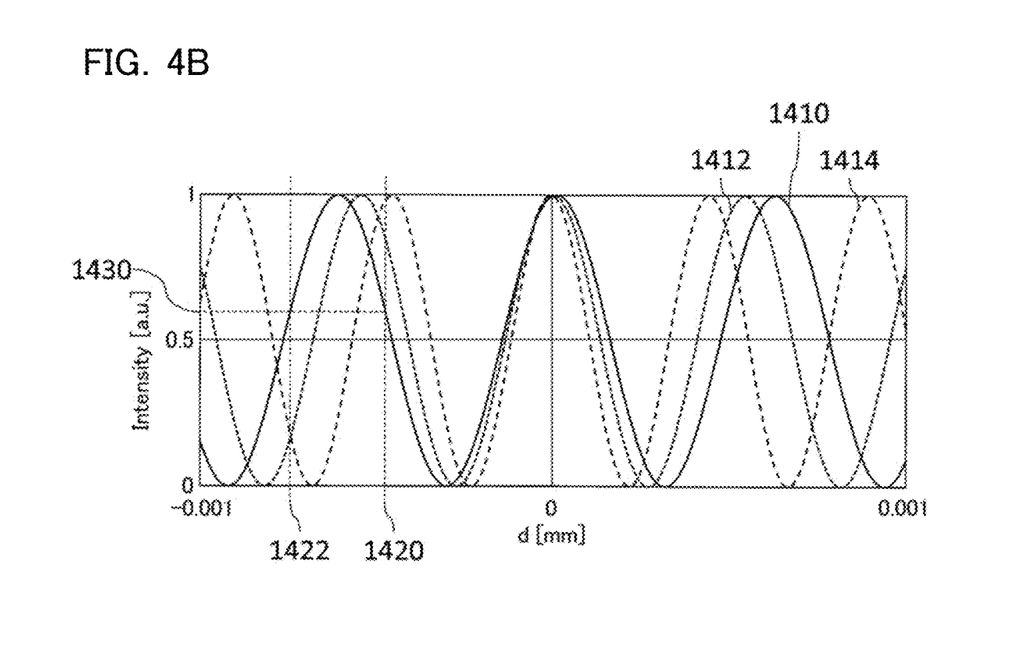
FIG. 4B is a graph showing a relationship of a light path difference d of two light paths relating to interference, and intensity of light when said interference has occurred, in the case where a generally utilizable optical system has been employed.

The interference fringes appearing due to interference of the white light occur as a result of strengthening and weakening of various wavelengths of light included in the white light. FIGS. 4A and 4B are graphs that, for three lights having differing wavelengths, of the lights included in the white light, show a relationship of a light path difference d of two light paths relating to interference, and strength (Intensity) of each wavelength of light when said interference has occurred, and 1410, 1412, and 1414 indicate plots relating to respective said three lights.

FIG. 4A is for the case where an ideal optical system has been employed, with the graph being symmetrical with respect to light path difference d=0 mm. On the other hand, FIG. 4B is for the case where a generally utilizable optical system has been employed, with the graph not being symmetrical with respect to light path difference d=0 mm.

FIG. 4B will be described referring again to FIG. 2B. A light that has first reached the beam splitter 1240 from the light source 350 is divided into at least a light reflected by a bottom surface of the beam splitter 1240 (this becomes the reference light), and a light reaching the measuring object 1230 without being reflected (this becomes the measuring light). Now, the former light passes through an upper surface from the bottom surface of the beam splitter 1240, is reflected by the reference mirror 1250, again reaches the bottom surface from the upper surface of the beam splitter 1240, and is synthesized with the light that has been reflected by the measuring object 1230. That is, the reference light passes at least two extra times between the upper surface and the bottom surface of the beam splitter 1240, with respect to the measuring light, and there occurs a phase delay proportionate to this. Moreover, magnitude of this phase delay usually depends on the wavelength of the light. Therefore, even in the case of light path difference d=0 mm, effects of the phase delay occurring only in the reference light result in that intensification of the lights relating to 1410, 1412, and 1414 strictly do not become maximum but become as in the graph shown in FIG. 4B. Note that although only the beam splitter 1240 has been described in the above description, such a phase delay occurs also in the other various kinds of optical system members or the measuring object 1230, and the phase delays occurring in the two of the reference light and the measuring light may differ even in the case where light path lengths of the two are equal. In other words, the generally utilizable optical system is configured so that the light path difference closest to zero for which intensification of the light due to interference becomes maximum, differs according to the wavelength of the light.

FIG. 4B will be further described. An intensity 1430 of the light relating to 1410 when the light path difference d is indicated by 1420 is equal to when the light path difference d is indicated by 1422. However, intensities of the lights relating to 1412 and 1414 when the light path difference d is indicated by 1420 differ from when the light path difference d is indicated by 1422. In other words, it is possible to distinguish between when the light path difference is indicated by 1420 and when the light path difference is indicated by 1422 from intensities of the lights relating to 1410, 1412, and 1414, more specifically, from a ratio of configuring elements of color determined by said intensities.

According to an experiment of the applicant, it is understood that, in the case where the lights relating to 1410, 1412, and 1414 have been assumed to respectively correspond to the three primary colors of light, that is, red, green, and blue, the light path difference d is uniquely determined from the ratio of configuring elements of color of the light, that is, red, green, and blue, in a range of the light path difference where interference fringes appear. Now, it is possible for the ratio of red, green, and blue to be easily found from the RGB value of each of pixels in an image 1300 like that shown in FIG. 3.

2-2 Regarding Derivation of Shape of Measuring Object 1230

Figure 5:
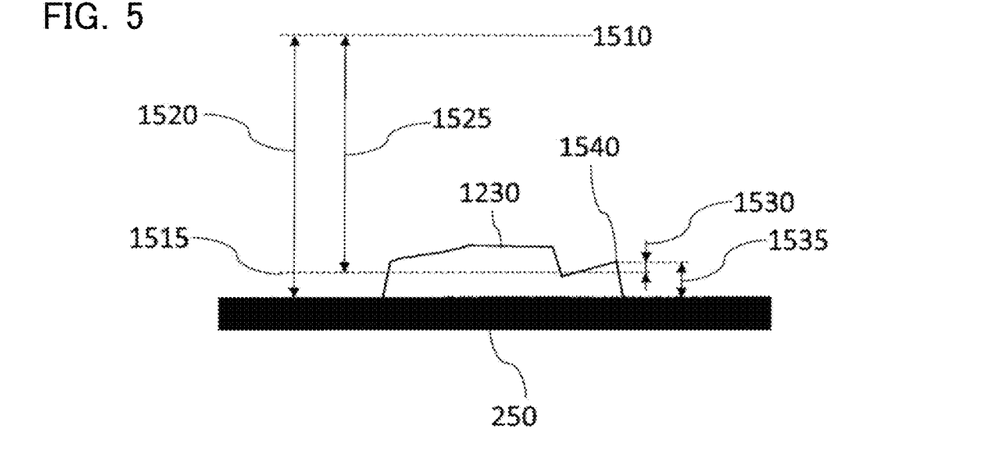
FIG. 5 shows each of distances relating to the optical system 1110.

FIG. 5 shows enlarged a part of the optical system 1110 whose outline is shown in FIG. 2B. 1510 indicates a Z axis position representing an arbitrarily set reference (hereafter, called "reference Z axis position"), and 1515 indicates a Z axis position where the light path difference d will be zero. In addition, 1520 indicates a Z axis distance d1 between the reference Z axis position 1510 and an upper surface of the placing plate 250, and 1525 indicates a Z axis distance d2 between the reference Z axis position 1510 and the Z axis position 1515. Furthermore, 1530 indicates a Z axis distance d3 between a Z axis position at a point 1540 of the measuring object 1230 and the Z axis position 1515, and 1535 indicates a Z axis distance h between the point 1540 of the measuring object 1230 and the upper surface of the placing plate 250.

The distances d1 and d2 are values measurable and storable in advance, that do not depend on the measuring object 1230. Note that if the reference Z axis position 1510 is set at a Z axis position of the upper surface of the placing plate 250, the distance d1 will be zero. Moreover, the distance d3 corresponds to an X axis value d of the graph shown in FIG. 4B, that is, a light path difference, that has been converted into a physical distance, and may take both a positive or a negative value. A conversion coefficient from the light path difference d to the distance d3 is also a value measurable and storable in advance, that does not depend on the measuring object 1230.

Hence, according to the principle mentioned in 2-1, if d is measured from a color of a pixel corresponding to the point 1540 in the image 1300, then the distance h at the point 1540 can be measured by the following expression.

$$h=(d1-d2)+d3 \quad (1)$$

If the distance h at each point of the measuring object 1230 is measured, then the shape of the measuring object 1230 can be measured by a publicly known method.

2-2 Regarding Information Stored by Storage Section 1120

The information for measuring the light path difference of two light paths relating to interference of a white light, from a color appearing due to the interference, according to the principle mentioned in 2-1, can be generated and stored in the storage section 1120 in advance.

The information stored by the storage section 1120 in the present embodiment is a table configured from a plurality of sets of: a value enabling derivation of a ratio of configuring elements of a color; and a value enabling derivation of the light path difference d corresponding to said ratio. In more detail, the "value enabling derivation of a ratio of configuring elements of a color" in the present embodiment is a ratio of an RGB value (for example, [1.0, 0.5, 0]). The "value enabling derivation of a ratio of configuring elements of a color" in another embodiment may be an arbitrary value enabling derivation of a ratio of configuring elements of a color, such as the RGB value itself that would be included in a pixel (for example, [128, 64, 0]) or said RGB value converted into an HSV value (for example, [30, 100, 50]). Moreover, the "value enabling derivation of the light path difference d" in the present embodiment is a value of the light path difference d itself. The "value enabling derivation of the light path difference d" in another embodiment may be an arbitrary value enabling derivation of the light path difference d, such as a value that has had an offset of h, d in expression (1) or a fixed multiple of h added thereto.

Regarding generation of such a table, a measuring object 1230 whose shape is already known, that is, a measuring object 1230 whose distance h in expression (1) is already known at each point is used to acquire an image 1300, and the table can be generated based on the distance h already known at each point, and the ratio of configuring elements of color of the pixel in the image 1300 corresponding to each point. For example, if a sufficiently flat plate inclined with a gauge of known height sandwiched in-between is used as the measuring object 1230, it would be possible for the above-described table to be generated.

Note that a correspondence relationship of the ratio of configuring elements of color and the light path difference corresponding to said ratio may differ according to a material of the measuring object 1230. This is because when a light is reflected by the measuring object 1230, there sometimes occurs a phase delay depending on its material (there also exist materials whose phase delay is zero, such as quartz glass). Hence, the above-described table is preferably generated using a measuring object 1230 of the same material as the one actually to be measured.

The information stored by what corresponds to the storage section 1120 in another embodiment is a program implementing a numerical calculation by a theoretical formula deriving from a value representing configuring elements of color, for example, an RGB value the light path difference d corresponding to said value. Moreover, the information stored by what corresponds to the storage section 1120 in another embodiment may include a calibration program implementing a numerical calculation for generating the above-described table from a measurement result on a measuring object 1230 whose shape is already known.

3 Schematic Operation of System 1100

Figure 6:
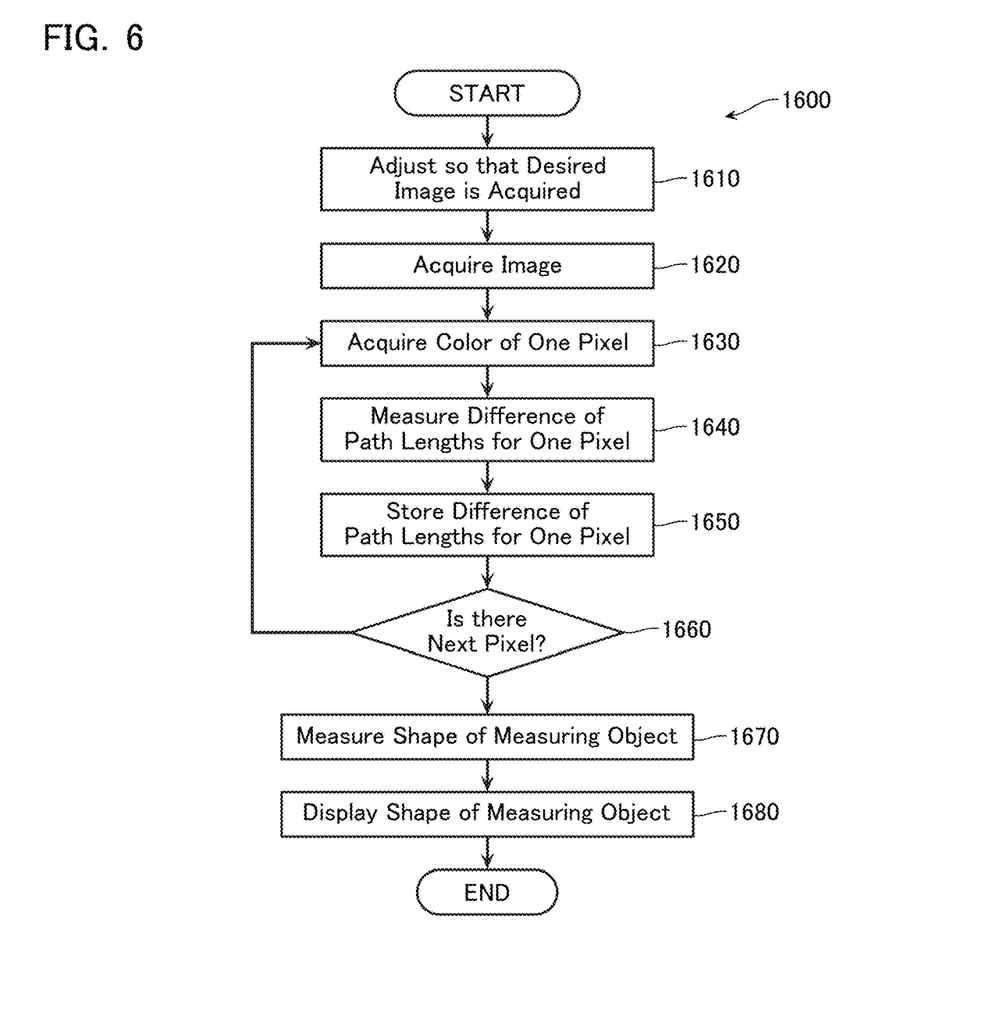
FIG. 6 is a flowchart showing schematic operation of the system 1100.

FIG. 6 is a flowchart 1600 showing schematic operation of the system 1100.

1610 is a step in which the measuring object 1230 is placed on the placing plate 250, and the X axis rotation operation section 231, the Y axis rotation operation section 241, and the Z axis rotation operation section 320 are operated to move the microscope main body 300 relatively to the placing plate 250 and thereby adjust so that the measuring object 1230 is included in an imaging range of the camera 340 and interference fringes due to a white light appear.

1620-1660 are steps in which the calculation section 1130 measures, from the image 1300 imaged by the camera 3340, the light path difference d relating to each of the pixels of the image 1300, based on the information stored in the storage section 1120.

In more detail, 1620 shows a step in which the image 1300 is acquired from the camera 340.

1630 shows a step in which the color of one pixel in the acquired image 1300 is acquired. Specifically, this step in the present embodiment is a step in which the RGB value of the pixel is acquired.

1640 shows a step in which the light path difference d relating to said pixel is measured from the acquired color, based on the information stored in the storage section 1120. Specifically, this step in the present embodiment is a step in which the ratio of the RGB value of the pixel and the ratio of the configuring elements of color in the table stored in the storage section 1120 are compared, whereby a matching or closest ratio is determined, and the light path difference d corresponding to the determined ratio is acquired.

1650 shows a step in which the measured light path difference d is stored associated with said pixel, at least temporarily.

1660 shows a step in which it is determined whether there exists a pixel whose light path difference d has not been measured yet. If such a pixel exists, then operation returns to step 1630, and if such a pixel does not exist, then operation proceeds to step 1670.

1670 shows a step in which the calculation section 1130 measures, from the measured light path difference d relating to each of the pixels, the shape of the measuring object 1230. Specifically, this step may be a step in which the distance h in expression (1) relating to each of the pixels is derived, and the shape of the measuring object 1230 is measured by a publicly known method from the derived distance h relating to each of the pixels.

1680 shows a step in which the display section 1140 displays the measured shape of the measuring object 1230.

4 Outline of Computer

Figure 7:
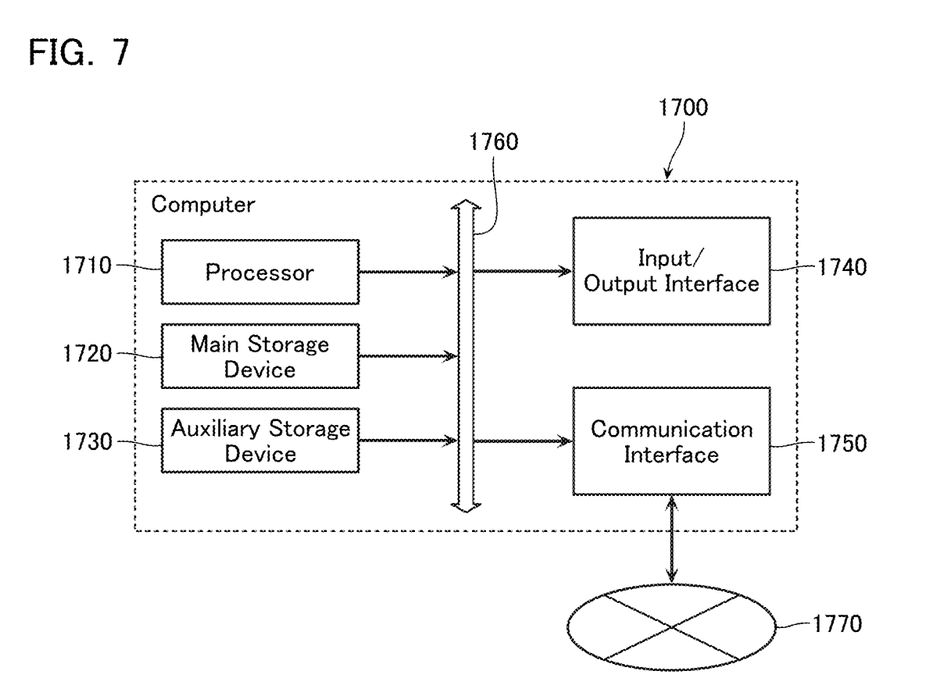
FIG. 7 is a block diagram showing a hardware configuration example of a computer.

FIG. 7 shows one example of hardware configuration of the computer. As shown in this FIG. 7, a computer 1700 comprises as hardware resources mainly a processor 1710, a main storage device 1720, an auxiliary storage device 1730, an input/output interface 1740, and a communication interface 1750, and these are mutually connected via a bus line 1760 that includes an address bus, a data bus, a control bus, and so on. Note that sometimes, also, an appropriate interface circuit (not illustrated) interposes between the bus line 1760 and each of the hardware resources. Moreover, sometimes, also, the hardware resources are each connected directly, without the bus line 1760 being present.

The processor 1710 performs overall control of the computer. The processor 1710 may be configured by a plurality of processors each performing partial or overall control of the computer.

The main storage device 1720, which provides a work area to the processor 1710, is a volatile memory such as an SRAM or DRAM, for example.

The auxiliary storage device 1730 is a nonvolatile memory such as a hard disk drive or a flash memory, for example, that stores a program being software (including a computer execution enabling instruction), and so on, or various kinds of data, and so on. The program is loaded into the main storage device 1720 via the bus line 1760 from the auxiliary storage device 1730 at an arbitrary time point, and causes the processor 1710 to execute various kinds of processings, methods, or steps.

The input/output interface 1740, which performs connection to various kinds of peripheral devices, connects to the computer 1700 the likes of a keyboard, a mouse, a track pad, a track pointer, a display, a touch panel display, a microphone, a speaker, an acceleration sensor, a camera, a scanner, and a printer, for example. It should be noted that these peripheral devices are sometimes regarded as a part of the computer 1700.

The communication interface 1750, which is connected to a network 1770, transmits and receives data via the network 1770. The communication interface 1750 and the network 1770 may be connected by wire or wirelessly. The communication interface 1750 sometimes acquires also network-related information, for example, information relating to Wi-Fi access points, information concerning base stations of a communication carrier, and so on. Note that the communication interface 1750 is not essential to the embodiment of the present invention.

What is claimed is:

1. A system including:
    a device; and
    an optical system,
    the device including:
    a storage section that stores information for measuring a light path difference of two light paths relating to interference of a white light, from a color appearing due to the interference; and
    a calculation section that measures, from an image configured by a plurality of pixels each including information representing a color, the light path difference relating to each of the pixels, based on at least the information stored in the storage section,
    the optical system including:
    a light source section that generates the white light;
    an imaging section that generates the image;
    a reference object;
    a light path being a first light path from the light source section to the imaging section, the light path being turned back by at least the reference object; and
    a light path being a second light path from the light source section to the imaging section, the light path being turned back by at least the measuring object,
    and the optical system being configured so that a light passing along the first light path and a light passing along the second light path interfere,
    the information stored in the storage section being determined based at least partially on the optical system and the measuring object, wherein
    the optical system is configured so that the light path difference closest to zero for which intensification of the light due to the interference becomes maximum, differs according to a wavelength of the light.

2. The system according to claim 1, wherein the information stored in the storage section is a table configured from a plurality of sets of: a value enabling derivation of a ratio of configuring elements of a color; and a value enabling derivation of the light path difference corresponding to said ratio.

3. The system according to claim 1, wherein
    the measuring object is imaged in the image,
    the calculation section further measures a shape of the measuring object from the measured light path difference relating to each of the pixels, and
    the device further includes a display section for displaying the measured shape of the measuring object.

4. The system according to claim 1, wherein the light path difference is measured in a state where a light path length of the first light path and a light path length of the second light path have been fixed.

5. A system including:
    a computer that executes a program by which the computer having stored therein information for measuring a light path difference of two light paths relating to interference of a white light, from a color appearing due to the interference, is caused to measure, from an image configured by a plurality of pixels each including information representing a color, the light path difference relating to each of the pixels, based on at least the stored information; and
    an optical system, the optical system including:

a light source section that generates the white light;

an imaging section that generates the image;

a reference object;

a light path being a first light path from the light source section to the imaging section, the light path being turned back by at least the reference object; and a light path being a second light path from the light source section to the imaging section, the light path being turned back by at least the measuring object, and the optical system being configured so that a light passing along the first light path and a light passing along the second light path interfere, the information stored in the computer being determined based at least partially on the optical system and the measuring object, wherein the optical system is configured so that the light path difference closest to zero for which intensification of the light due to the interference becomes maximum, differs according to a wavelength of the light.

6. The system according to claim 5, wherein the information stored in the computer is a table configured from a plurality of sets of:

a value enabling derivation of a ratio of configuring elements of a color; and a value enabling derivation of the light path difference corresponding to said ratio.

7. The system according to claim 5, wherein a measuring object is imaged in the image, the program further measures a shape of the measuring object from the measured light path difference relating to each of the pixels, and the computer further executes a display program for displaying the measured shape of the measuring object.

8. A system including:

a computer that executes a calibration program and a measurement program; and an optical system, the calibration program by which the computer is caused to acquire and store information for measuring a light path difference of two light paths relating to interference of a white light, from a color appearing due to the interference, and the measurement program by which the computer having the information stored therein is caused to measure, from an image configured by a plurality of pixels each including information representing a color, the light path difference relating to each of the pixels, based on at least the stored information, the optical system including:

a light source section that generates the white light;

an imaging section that generates the image;

a reference object;

a light path being a first light path from the light source section to the imaging section, the light path being turned back by at least the reference object; and a light path being a second light path from the light source section to the imaging section, the light path being turned back by at least the measuring object, and the optical system being configured so that a light passing along the first light path and a light passing along the second light path interfere, the information stored in the computer being determined based at least partially on the optical system and the measuring object, wherein the optical system is configured so that the light path difference closest to zero for which intensification of the light due to the interference becomes maximum, differs according to a wavelength of the light.

9. The system according to claim 8, wherein the information stored in the computer is a table configured from a plurality of sets of:

a value enabling derivation of a ratio of configuring elements of a color; and a value enabling derivation of the light path difference corresponding to said ratio.

10. The system according to claim 8, wherein a measuring object is imaged in the image, the measurement program further measures a shape of the measuring object from the measured light path difference relating to each of the pixels, and the computer further executes a display program for displaying the measured shape of the measuring object.

* * * * *